US009856409B2

(12) United States Patent
Dobson, Jr. et al.

(10) Patent No.: US 9,856,409 B2
(45) Date of Patent: Jan. 2, 2018

(54) DISSIPATIVE SURFACTANT AQUEOUS-BASED DRILLING SYSTEM FOR USE IN HYDROCARBON RECOVERY OPERATIONS FROM HEAVY OIL AND TAR SANDS

(71) Applicant: TUCC Technology, LLC, Houston, TX (US)

(72) Inventors: James W. Dobson, Jr., Houston, TX (US); Kim O. Tresco, Houston, TX (US); Pierre J. Hinds, Houston, TX (US)

(73) Assignee: TUCC Technology, LLC, Houston, TX (US)

( * ) Notice: Subject to any disclaimer, the term of this patent is extended or adjusted under 35 U.S.C. 154(b) by 274 days.

(21) Appl. No.: 14/610,808

(22) Filed: Jan. 30, 2015

(65) Prior Publication Data

US 2015/0166866 A1    Jun. 18, 2015

Related U.S. Application Data (63) Continuation of application No. 13/683,689, filed on Nov. 21, 2012, now abandoned.

(Continued)

(51) Int. Cl.
*C09K 8/035* (2006.01)
*C09K 8/08* (2006.01)
(Continued)

(52) U.S. Cl.
CPC ............... *C09K 8/08* (2013.01); *C09K 8/035* (2013.01); *C09K 8/06* (2013.01); *E21B 21/062* (2013.01); *C09K 2208/28* (2013.01)

(58) Field of Classification Search
CPC ...... C09K 2208/28; C09K 8/035; C09K 8/06; C09K 8/08; E21B 21/062
See application file for complete search history.

(56) References Cited

U.S. PATENT DOCUMENTS 3,761,410 A    9/1973  Mondshine et al.
4,966,685 A    10/1990  Hall et al.
(Continued)

FOREIGN PATENT DOCUMENTS

WO    87/03613 A2    6/1987
WO    96/40835 A1    12/1996

OTHER PUBLICATIONS

Canola Oil: Physical and Chemical Properties, 6 pages, printed Apr. 11, 2017.*

(Continued)

*Primary Examiner* — Alicia Bland
(74) *Attorney, Agent, or Firm* — Lewis, Reese & Nesmith, PLLC (57) ABSTRACT

A water-based drilling fluid which includes an aqueous fluid and a water-soluble dissipative surfactant composition is described, wherein the dissipative surfactant composition includes at least one fatty acid or ester derivative of a plant or vegetable oil. Also described are methods of using such aqueous-based drilling fluids including the dissipative surfactant composition as described in hydrocarbon recovery operations associated with oil/tar sand, where such fluids act to increase the dispersant qualities of hydrocarbons within the oil/tar sand, and where such fluid exhibit a reduced coefficient of friction.

13 Claims, 3 Drawing Sheets

Related U.S. Application Data (60) Provisional application No. 61/562,283, filed on Nov. 21, 2011.

(51) Int. Cl.
   *C09K 8/06* (2006.01)
   *E21B 21/06* (2006.01)

(56) References Cited

U.S. PATENT DOCUMENTS

| | | | |
|---|---|---|---|
| 5,807,811 | A | 9/1998 | Malchow, Jr. |
| 6,716,799 | B1* | 4/2004 | Mueller .................. C09K 8/12 507/138 |
| 6,719,799 | B1 | 4/2004 | Kropf |
| 2004/0248744 | A1 | 12/2004 | King et al. |
| 2005/0037930 | A1* | 2/2005 | Horton .................. C09K 8/22 507/128 |
| 2006/0003899 | A1* | 1/2006 | Levey .................. C09K 8/12 507/120 |
| 2007/0034553 | A1* | 2/2007 | Baltoiu .................. C09K 8/32 208/390 |
| 2008/0026954 | A1* | 1/2008 | Wu .................. C09K 8/28 507/103 |
| 2008/0139418 | A1 | 6/2008 | Cioletti et al. |
| 2008/0217064 | A1* | 9/2008 | Stoian .................. C09K 8/03 175/66 |
| 2011/0224108 | A1* | 9/2011 | Ewanek .................. C09K 8/12 507/120 |

OTHER PUBLICATIONS

Anonymous, "ProOne MSDS Bio Stable Water Soluble Cutting Fluid," ProOne Inc., Sep. 15, 2007.

Anonymous, "ProOne Case Study—ProOne Downhole Drilling Fluid. Major Operator The Bakken, North Dakota," ProOne Inc., Jan. 19, 2011.

Anonymous, "When it Comes to Reducing Costs ProOne Knows the Drill," Brochure, ProOne, Inc.

International Search Report for corresponding international patent application No. PCT/US2012/066344.

Written Opinion of the International Searching Authority for corresponding international patent application No. PCT/US2012/066344.

Nfor, Bruno et al., "Extraction of Oil from the Tar Sandsw of Ofosu and Environs, Edo State, Mid-Western Nigeria: A Way to Meet Increasing Energy Demand", Archives of Applied Science Research, 2011, vol. 3, No. 3, pp. 45-48.

\* cited by examiner

DISSIPATIVE SURFACTANT AQUEOUS-BASED DRILLING SYSTEM FOR USE IN HYDROCARBON RECOVERY OPERATIONS FROM HEAVY OIL AND TAR SANDS

CROSS REFERENCE TO RELATED APPLICATIONS

This application is a continuation of U.S. Non-Provisional patent application Ser. No. 13/683,689, filed Nov. 21, 2012, which claims priority to U.S. Provisional patent application Ser. No. 61/562,283, filed Nov. 21, 2011, which both are incorporated by reference, and to which priority is claimed.

BACKGROUND

Field of the Invention

The inventions disclosed and taught herein relate generally to components of well bore fluids and muds, and more specifically are related to water-based drilling fluids and components therein which are suitable for use in oil/tar sand formations.

Description of the Related Art

When drilling or completing wells in earth formations, various fluids are typically used in the well for a variety of reasons. Common uses for well drilling and completing fluids include lubrication and cooling of drill bit cutting surfaces while drilling, particularly during drilling-in (drilling in a targeted petroliferous formation), transportation of "cuttings" to the surface, controlling formation fluid pressure to prevent blowouts, maintaining well stability, cleaning the well, transmitting hydraulic horsepower to the drill bit, and otherwise treating the well or formation.

In numerous rotary drilling operations, the drilling fluid takes the form of a "mud"—that is, a liquid having solids suspended in it. The solids function to impart particularly desirable rheological properties to the drilling fluid, while simultaneously increasing the density of the fluid in order to provide a suitable hydrostatic pressure at the bottom of the well.

Drilling systems are generally characterized as thixotropic fluid systems. That is, they exhibit low viscosity when sheared, such as when in circulation (as occurs during pumping or contact with the moving drilling bit). However, when the shearing action is halted, the fluid should be capable of suspending the solids it contains to prevent gravity separation. In addition, when the drilling fluid is under shear conditions and a free-flowing near-liquid, it must retain a sufficiently high enough viscosity to carry all unwanted particulate matter from the bottom of the well bore to the surface. The drilling fluid formulation should also allow the cuttings and other unwanted particulate material to be removed or otherwise settle out from the liquid fraction. Further, it is important that drilling fluids minimize the torque and drag that occurs in association with the drill string, particularly during the drilling operation itself.

There is an increasing need for drilling fluids having rheological properties to enable wells to be drilled while minimizing torque and drag, particularly in more challenging formations, such as oil/tar sand. Oil sand or tar sand, as they are generally referred to, more accurately termed bituminous sand, are a type of unconventional petroleum deposit. The sand contains naturally occurring mixtures of sand, clay, water, and a dense and extremely viscous form of petroleum technically referred to as bitumen (or colloquially "tar" due to its similar appearance, odor, and color). Oil/tar sand is found in large amounts in many countries throughout the world, but are found in extremely large quantities in both Canada and Venezuela, with other reserves being located in Kazakhstan and Russia. These types of formations often have unconsolidated sands, and exhibit highly varied porosity and permeability, which can cause high friction on a drill string during drilling operations, resulting in excessive torque and drag on the drill string and drill bit, stuck pipe incidents, and shaker screen blinding, to name only a few. Thus, historically, the majority of drilling operations in oil/tar sand and similarly difficult to drill formations have used oil- or hydrocarbon-based drilling muds, or have incorporated diesel or similar compounds as lubricants to counteract the problems in dealing with such formations. While the use of such lubricants in the drilling fluids improves lubrication to such an extent that it permits the drilling of wells in difficult formations as well as vertically-deviated wells (e.g., horizontal wells) where torque, drag and the potential for pipe sticking on the drill string are significant, the lubricating characteristics of such fluids must be balanced with environmental considerations in using such hydrocarbon-based fluids.

The inventions disclosed and taught herein are directed to improved drilling and completion fluids and systems for use in hydrocarbon recovery operations, wherein the systems exhibit improved rheological properties, particularly when the drilling operations are in oil/tar sand. In particular, it has been advantageously found that the dissipative surfactant described herein acts not only to lower the coefficient of friction, but also as a dispersant that generates a uniform drilling fluid mixture with improved flow properties due to its anti-agglomeration/dispersive characteristics on oil/tar sand.

BRIEF SUMMARY

A water-based drilling fluid which includes an aqueous fluid, a gelling agent, an alkaline buffer, and a water-soluble, dissipative surfactant composition which includes at least one fatty acid or ester derivative of a plant or vegetable oil, and optionally an extreme pressure additive, is described, wherein the water-based drilling fluid is suitable for use in drilling oil/tar sand containing formations and exhibits reduced coefficient of friction characteristics in the drilling fluid.

In accordance with a first embodiment of the present disclosure, a water-based drilling fluid is described, the drilling fluid comprising an aqueous fluid and a dissipative surfactant composition comprising at least one fatty vegetable oil or fatty acid derived from a plant, an extreme pressure additive, and optionally at least one synthetic ester or diester. In further accordance with aspects of this embodiment, the fatty vegetable or plant oil in the dissipative surfactant composition comprises at least one of a triglyceride, ricinoleic acid, linoleic acid, oleic acid, stearic acid, palmitic acid, dihydroxystearic acid, linolenic acid, and eicosanoic acid. In at least one preferred aspect of this embodiment, the fatty acid is a $C_{14}$-$C_{28}$ fatty acid. In further aspects of this embodiment, the plant source of the fatty vegetable oil or fatty acid is selected from the group consisting of plants of the *Brassica* species, including canola and rapeseed, soy, corn, sunflower, cotton, cocoa, safflower, oil palm, coconut palm, flax, castor, peanut, wheat, oat, and rice, any of which may be naturally-occurring or transgenic (genetically-modified, such as to produce a higher amount of a specific fatty acid). The fluid may further comprise a number of additional, optional additives as appropriate, including at least one of a buffering agent, a filtration control additive, and a gelling agent.

In accordance with yet another embodiment of the present disclosure, a method of treating a well bore extending into a subterranean formation is described, the method comprising the steps of mixing an aqueous fluid and a dissipative surfactant composition comprising one fatty vegetable oil or fatty acid derived from a plant, an extreme pressure additive, and optionally at least one ester or diester, to form a water-based well bore fluid, and, thereafter using the water-based well bore fluid during a drilling operation.

In yet a further embodiment of the present disclosure, a well bore fluid is described, the fluid comprising an aqueous fluid and a dissipative surfactant composition comprising at least one vegetable oil, at least one extreme pressure and/or friction reducing additive, and optionally at least one ester or diester having from 8 to 30 carbon atoms. In further accordance with this embodiment, the dissipative surfactant composition contains an extreme pressure additive component that is non-halogenated and contains phosphorus, sulfur, or both.

In another embodiment of the present disclosure, a method of drilling a subterranean formation utilizing an aqueous based drilling fluid is described, wherein the drilling fluid is comprised of an aqueous base fluid and a dissipative surfactant additive system, wherein the dissipative surfactant system comprises: a plant or vegetable oil or vegetable oil triglyceride obtained from naturally-occurring or genetically-modified plant species selected from the group consisting of *Brassica, Helianthus, Glycine max, Zea mays, Crambe*, and *Limnanthes* species; and a phosphorus- or sulfur-containing friction reducing or extreme pressure additive; and wherein the method includes adding an effective amount of the dissipative surfactant system to substantially reduce the coefficient of friction compared to a fluid absent the dissipative surfactant system.

BRIEF DESCRIPTION OF THE SEVERAL VIEWS OF THE DRAWINGS

The following Figures form part of the present specification and are included to further demonstrate certain aspects of the present invention. The invention may be better understood by reference to one or more of these Figures in combination with the detailed description of specific embodiments presented herein.

While the inventions disclosed herein are susceptible to various modifications and alternative forms, only a few specific embodiments have been shown by way of example in the drawings and are described in detail below. The Figures and detailed descriptions of these specific embodiments are not intended to limit the breadth or scope of the inventive concepts or the appended claims in any manner. Rather, the Figures and detailed written descriptions are provided to illustrate the inventive concepts to a person of ordinary skill in the art and to enable such person to make and use the inventive concepts.

DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Applicants have created an improved aqueous-based drilling and completion fluid for use in hydrocarbon recovery operations, particularly those involving the presence of oil/tar sand, wherein the drilling and completion fluid includes an aqueous fluid and an environmentally friendly dissipative medium, optionally referred to herein as a "dissipative surfactant," wherein the dissipative surfactant includes at least one fatty acid or oil derived from a plant, particularly a fatty acid or oil derived from a vegetable, which may be transgenic or not (e.g., naturally-occurring), and at least one phosphorus or sulfur-containing extreme wear additive. In particular, it has been advantageously found that the inclusion of the dissipative surfactant composition displays anti-agglomeration/dispersive characteristics on oil/tar sand, thereby generating a uniform drilling fluid mixture with improved fluid flow properties and a reduced coefficient of friction.

Embodiments disclosed herein particularly relate to dissipative surfactants for use in aqueous, water-based wellbore or drilling fluid formulations. In particular, embodiments described herein relate to aqueous wellbore fluid treating systems which comprise dissipative surfactant compositions in turn comprising fatty acids and ester derivatives of fatty acids found in plant oils, such as those from the family *Brassica*. In the following description, numerous details are set forth to provide an understanding of the present disclosure. However, it will be understood by those skilled in the art that the present disclosure may be practiced without these details and that numerous variations or modifications from the described embodiments may be possible.

In one embodiment, a water-based drilling fluid comprises an aqueous fluid, a dissipative surfactant composition, and optionally at least one of a buffering agent, alkaline buffer, and a gelling or viscosifying agent, as may be appropriate. The dissipative surfactant composition may comprise at least one fatty acid or fatty acid derivative, saturated or unsaturated, of either cis- or trans-geometry that is derived from a plant oil, preferably a food or vegetable oil. In another embodiment, a wellbore fluid may comprise an aqueous fluid and a dissipative surfactant composition, wherein the dissipative surfactant composition comprises at least one fatty acid or fatty acid derivative, saturated or unsaturated, of either cis- or trans-geometry that is derived from a plant oil (naturally occurring or transgenic), preferably a food or vegetable oil, wherein the fatty acid or fatty acid derivative may comprise oleic acid, an oleic acid ester, a triglyceride, or a derivative thereof. One of ordinary skill in the art would recognize that drilling or well bore fluids may also comprise various other additives, as appropriate, including biocides and the like.

Plant Oil-Based Dissipative Surfactant

In accordance with one embodiment of the present disclosure, an aqueous (water-based) drilling fluid exhibits improved drilling characteristics, particularly in oil/tar sands, the fluid comprising an aqueous fluid and a dissipative surfactant composition or system admixed with the aqueous fluid, the dissipative surfactant composition comprising a vegetable-based or plant-based oil (either natural or transgenic), hydrogenated or non-hydrogenated, or a synthetic triglyceride derived from such an oil, and at least one of a friction reducing/extreme pressure additive and a synthetic or natural diester. Preferably, the dissipative surfactant composition of the present disclosure is water soluble or substantially (e.g., at least 95%, and preferably at least 98-99% soluble in water or an aqueous solution) water soluble. Further, the dissipative medium, or dissipative surfactant composition, is present in the water-based drilling or wellbore fluids described herein in an amount ranging from about 1 vol. % to about 10 vol. %, inclusive, including about 2 vol. %, about 3 vol. %, about 4 vol. %, about 5 vol. %, about 6 vol. %, about 7 vol. %, about 8 vol. %, and about 9 vol. %, as well as ranging within this range (e.g., from about 2 vol. % to about 8 vol. %, or from about 3 vol. % to about 6 vol. %), based on the total volume of the drilling fluid system.

As used herein, the term "transgenic" refers to a "transgenic plant", which means a plant whose genome has been altered by the stable integration of recombinant DNA. A transgenic plant includes a plant regenerated from an originally-transformed plant cell and progeny transgenic plants from later generations or crosses of a transformed plant. As used herein "recombinant DNA" means DNA which has been a genetically engineered and constructed outside of a cell including DNA containing naturally occurring DNA or cDNA or synthetic DNA. Exemplary transgenic plants that are suitable for use with the compositions of the present disclosure include those cultivars of *Brassica* species, such as canola cultivars, that comprise an oleic acid value of 65% or higher (at least 65% oleic acid (018:1), and optionally less than 3% linolenic acid (C18:3).

Generally, the dissipative surfactant of the present disclosure utilizes plant or vegetable oil fatty acids or esters thereof, glycerides or triglycerides ($C_5$-$C_{28}$) derived from plants or vegetable seeds. These natural oils typically contain $C_{16}$ palmitic acid, and $C_{18}$ stearic, oleic, linoleic, and linolenic acids (alpha-(C18:3) and gamma (C18:3), among others. The dissipative surfactant composition may be composed of from about 20% to 95% natural plant oil or a fatty acid, fatty acid ester, triglyceride, or glyceride obtained therefrom. Preferably the oil is in the amount of up to or about 30, 40, 50, 55, 60, 65, 75, 80, 85 or 90% of the dissipative surfactant composition. More preferably the plant or vegetable oil is included in the dissipative medium of the aqueous treating fluid in an amount up to or about 75 wt. or vol. % of the composition. The dissipative surfactant may also, optionally comprise one or more esters or diesters, either synthetic or naturally occurring, preferably esters or diesters having from 10 to 30 carbons (e.g., $C_{10}$-$C_{30}$), inclusive, in an amount ranging from about 10 vol. % to about 50 vol. %, including about 20 vol. %, 30 vol. %, and 40 vol. %. Finally, and as will be detailed herein, the dissipative surfactant may comprise one or more extreme pressure and/or friction reducing additives.

In one embodiment, a dissipative surfactant composition may include a plant oil derivative that is formed by reaction of at least one fatty acid derived from the plant oil (e.g., canola oil or an oil from *Brassica, Helianthus, Glycine max, Zea mays, Crambe*, and *Limnanthes* species) with at least one mono-, di-, tri-, or polyol to form a fatty acid ester derivative. Such fatty acids naturally occurring in a plant-derived oil may include, but are not limited to, at least one of ricinoleic acid, oleic acid, stearic acid, palmitic acid, dihydroxystearic acid, linoleic acid, alpha-linoleic acid, gamma-linolenic acid, and eicosanoic acid (C20:0), as well as other saturated and unsaturated fatty acids and fatty acid esters. The functional groups, such as hydroxyl groups (as on ricinoleic acid, palmitic acid, and stearic acid) and olefin functionalities may allow for further chemical functionalization of the fatty acid, and consequently further refinement of the physical properties of the compounds. According to certain embodiments, the ester is derived from sorbitan or pentaerythritol. Additionally, ester derivatives of fatty acids found in plants or vegetables (naturally occurring or transgenic) may be non-toxic and readily biodegradable, adding to their desirability for use in the dissipative surfactant compositions of the present disclosure. Suitable vegetable oils for use in the dissipative surfactant compositions of the invention include for example, and without limitation, rapeseed (*Brassica*), sunflower (*Helianthus*), soybean (*Glycine max*), corn (*Zea mays*), crambe (*Crambe*), and meadowfoam (*Limnanthes*) oil. In one preferred aspect, canola oil (typically obtained from genus *Brassica napus* L. or *Brassica campestris* L., or a blend thereof, either natural or transgenic) is preferred for use.

The term "glyceride" as used herein refers to glycerides that are derived from natural, particularly plant, sources, as well as to glycerides that are synthetically produced. Glycerides are esters of glycerol (a trihydric alcohol) and fatty acids in which one or more of the hydroxyl groups of glycerol are esterified with the carboxyl groups of fatty acids containing from about 4 to about 75 carbon atoms and preferably from about 6 to about 24 carbon atoms. The fatty acids can be saturated or unsaturated, linear, branched or cyclic monocarboxylic acids. Where three hydroxyl groups are esterified, the resulting glyceride is denoted as a "triglyceride." When only one or two of the hydroxyl groups are esterified, the resulting products are denoted as "monoglycerides" and "diglycerides," respectively. Natural glycerides are mixed glycerides comprising triglycerides and minor amounts, e.g., from about 0.1 to about 40 mole percent, of mono- and diglycerides. Natural glycerides include, e.g., coconut, sunflower, and soybean (*Glycine max*) oils. Synthetically produced glycerides, in accordance with the present disclosure, are synthesized by a condensation reaction between glycerol and a fatty acid or mixture of fatty acids containing from about 6 to about 24 carbon atoms and obtained from a natural or transgenic plant or vegetable source. The fatty acid can be a saturated or unsaturated, linear, branched, a cyclic monocarboxylic acid, or mixture thereof. The fatty acid itself can be derived from, for example, natural (or transgenic), i.e., plant/vegetable, sources as suggested above. Examples include, but are not limited to, caproic, caprylic, capric, lauric, myristic, palmitic, stearic, arachidic, arachidonic, oleic, linoleic and alpha-, gamma-, and dihomo gamma-linolenic acids, and mixtures of any of the foregoing. The synthetically produced glycerides will contain from about 80 to about 100 mole percent triglycerides with the balance, if any, representing from about 0 to about 20 mole percent mono and di-glycerides, present in admixture with triglycerides.

As indicated above, the oil, fatty acid, or fatty acid derivative useful in formulating the dissipative surfactant compositions of the present invention are derived from, for example, natural sources, i.e., those derived from natural sources such as naturally-occurring plants and vegetables; transgenic plants and vegetables; and combinations thereof. Natural oils useful in the dissipative surfactant compositions of the present disclosure include, but are not limited to, coconut oil, babassu oil, palm kernel oil, palm oil, olive oil, castor oil, rape oil, corn oil, beef tallow oil, whale oil, sunflower, cottonseed oil, linseed oil, tung oil, tallow oil, lard oil, peanut oil, canola oil, soya oil, and the like. Optionally, in accordance with select aspects of the disclosure, the oil can be synthetic oil based on or derived in part from a natural or transgenic oil, fatty acid, or fatty acid derivative. Such natural material based synthetic oils suitable for use herein refers to products produced by reacting carboxylic acids with glycerol, e.g., glycerol triacetate, and the like, to form glycerol esters. Suitable starting oils can contain triacylglycerols (TAGs), which contain three fatty acid chains esterified to a glycerol moiety and can be natural or synthetic. For example, TAGs such as triolein, trieicosenoin, or trierucin can be used as starting materials. TAGs are commercially available from a variety of commercial sources, for example, from Aldrich Chemical Company (St. Louis, Mo.), or can be synthesized using standard techniques, such as, for example, from naturally-occurring tallow oil, palm oil, castor oil, cottonseed oil, corn oil, peanut oil, rapeseed oil (including canola oil), safflower oil, sesame oil, soybean oil, sunflower oil, olive oil, coconut oil, palm kernel oil, babassu oil, canola oil, soya oil, nut oils (e.g., almond oil), citrus oils (e.g., lemon oil) and the oils from the seeds of members of the citrus family, oils from members of the Cucurbitaceae family (gourds, melons, pumpkins and squashes), and the like, as well as combinations of such oils, with canola oil (naturally derived or transgenic) being preferred for use herein.

The foregoing glycerol esters will contain from about $C_4$ to about $C_{75}$ and preferably contain about $C_6$ to about $C_{28}$ fatty acid esters, i.e., several fatty acid moieties, the number and type varying with the source of the oil. Fatty acids are a class of compounds containing a long hydrocarbon chain and a terminal carboxylate group and are characterized as unsaturated or saturated depending upon whether a double bond is present in the hydrocarbon chain. Therefore, an unsaturated fatty acid has at least one double bond in its hydrocarbon chain whereas a saturated fatty acid has no double bonds in its fatty acid chain. Examples of unsaturated fatty acids include, but are not limited to, myristoleic acid, palmitoleic acid, oleic acid, linolenic acid, and the like. Examples of saturated fatty acids include caproic acid, caprylic acid, capric acid, lauric acid, myristic acid, palmitic acid, stearic acid, arachidic acid, behenic acid, lignoceric acid, and the like.

The acid moiety may be supplied in a fully esterfied compound or one which is less than fully esterfied, e.g., glyceryl tri-stearate, or glyceryl di-laurate and glyceryl mono-oleate, respectively. It is particularly advantageous to employ plant derived oils, i.e., vegetable oils, as starting materials, as they allow the reaction products herein to be produced in a cost-effective manner. Suitable vegetable oils have a monounsaturated fatty acid content of at least about 50%, based on total fatty acid content, and include, for example, rapeseed (*Brassica*), sunflower (*Helianthus*), soybean (*Glycine max*), corn (*Zea mays*), crambe (*Crambe*), and meadowfoam (*Limnanthes*) oil. Canola oil (typically obtained from genus *Brassica napus* L. or *Brassica campestris* L., or a blend thereof), which has less than 2% erucic acid, is a particularly useful rapeseed oil. Oils having a monounsaturated fatty acid content of at least 70% are also particularly useful. The monounsaturated fatty acid content can be composed of, for example, oleic acid (C18:1), eicosenoic acid (C20:1), erucic acid (C22:1), or combinations thereof.

Further, non-limiting examples of species to which the invention is applicable include species of the genus *Brassica, Allium*, and *Beta*. In one particularly advantageous embodiment, the dissipative medium can comprise at least one fatty vegetable oil or fatty acid obtained or derived from the seeds of small seeded vegetables. Non-limiting examples of species from which such fatty vegetable oil or fatty acids may be obtained include but are not limited to: *Allium cepa; Allium porum; Brassica oleracea; Brassica campestris; Brassica napus; Beta vulgaris*; and *Daucus carota*.

In one non-limiting embodiment of the invention, the dissipative surfactant composition includes natural or transgenic canola oil or an oil from a *Brassica* species (naturally occurring or transgenic), or the mixture of fatty acids naturally occurring in such oil, that has been subjected directly to esterification with at least one mono-, di-, tri-, or polyol to form a mixture of fatty acid ester derivatives. In another embodiment, any combination of fatty acids including ricinoleic acid, oleic acid, stearic acid, palmitic acid, dihydroxystearic acid, linoleic acid, linolenic acid, or eicosanoic acid may be esterifed with at least one mono-, di-, tri-, or polyol.

In an optional aspect of the disclosure, at least one fatty acid derived from canola oil or an oil derived from a *Brassica* species of plant (natural or transgenic) may be reacted with at least one mono-, di-, tri-, or Polyol to form a fatty acid ester suitable for use in the dissipative mediums described herein. The reaction of at least one fatty acid with at least one mono-, di- tri-, or polyol may be conducted in a manner known by those skilled in the art. Such reactions may include, but are not limited to, Fischer (acid-catalyzed) esterification and acid-catalyzed transesterification, for example.

Friction Reducer/Extreme Pressure Additive.

In an exemplary embodiment of the invention, as indicated above, the dissipative surfactant useful in the aqueous fluid compositions of the present disclosure preferably includes one or more extreme pressure or friction reducing additives (referred to equivalently herein as "extreme pressure additives"), which may be halogenated or non-halogenated, and which preferably are water-soluble. In accordance with certain aspects of the present disclosure, the extreme pressure additive is a sulfur- or phosphorus-based derivative, or a combination of sulfur- and/or phosphorus-containing compounds (e.g., a thiocarbamate and a phosphate), or a combination of such compounds that is polar and sterically small enough to interact with the metal surface of a piece of drilling equipment (e.g., drill string, drill bit, etc.), and preferably one that is environmentally responsible.

The term 'phosphorous-based' extreme pressure additive means a phosphorus-based derivative of an organic compound, such as phosphorus-based amine phosphates or phosphorus-based alkyl or alcohol phosphates, including alkylamine or alkanolamine salts of phosphoric acid, butylamine phosphates, long chain alkyl amine phosphates, organophosphites, propanolamine phosphates, or other hydrocarbon amine phosphates, including triethanol, monoethanol, dibutyl, dimethyl, and monoisopropanol amine phosphates. The phosphorus-based derivative may be also an ester including thioesters or amides of phosphorous containing acids. Additionally, the organic moiety from which the phosphorous compound is derived may be an alkyl, alcohol, phenol, thiol, thiophenol or amine. The three organic residues of the phosphate compound may be one or more of these or combinations. In select aspects of the present disclosure, alkyl groups with 1 to 12 carbon compounds are suitable. A total carbon content of 2 to 12 carbon atoms is particularly suitable. The phosphorous based compound may be a phosphorous oxide, phosphide, phosphite, phosphate (including mono- and di-hydrogen phosphates), pyrophosphate and thiophosphate, and may be halogenated (e.g., containing one or more chlorine atoms) or non-halogenated.

In accordance with select aspects of the present disclosure, dissipative surfactant compositions and systems may include extreme pressure additives/friction reducing compounds that are water-based or water-soluble. In example, suitable water-soluble extreme pressure additives include ethoxylated alkylalcohols, and particularly the alkali metal salt of a phosphate ester of an ethoxylated alkylalcohol.

The term "alkali metal salt" as used herein refers to lithium, sodium, or potassium salts, preferably the sodium or potassium salts.

The term "alkylalcohol" as used herein means $C_6$-$C_{24}$ linear or branched alkylalcohols such as, without limitation, butanol, sec-butanol, isobutanol, 3-methyl-1-butanol, pentanol, 2-pentanol, hexanol, 2-hexanol, 2-methyl-2-pentanol, 1-heptanol, 2-heptanol, 1-octanol, 2-octanol, 2-ethyl-1-hexanol, 2,4,4-trimethyl-1-pentanol, nonanol, 2,6-dimethyl-4-heptanol, decanol, isodecanol, undecanol, dodecanol, tridecanol, pentadecanol, hexadecanol, heptadecanol, octadecanol, 2,4,4-trimethyl-1-pentanol, and the like. The alkylalcohols includes alkoxylated alcohols, which includes alkoxylated monohydric alcohols or alkoxylated polyhydric alcohols. The alkoxy alcohols are generally produced by treating an alcohol with an excess of an alkylene oxide such as ethylene oxide or propylene oxide. Exemplary alkylalcohols include ethyoxylated linear alcohols, which may be represented by the general structural formula $$CH_3(CH_2)_xCH_2(OCH_2CH_2)_nOH$$

where x is an integer ranging from 4 to 18 (inclusive), and n is an integer ranging between 1 and 11 (inclusive). An exemplary, non-limiting phosphorus-containing extreme pressure additive suitable for use in the compositions of the present disclosure is a potassium phosphate salt of an alkylalcohol, such as for example alpha-isodecyl-omega-hydroxy-poly(oxy-1,2-ethanediyl)phosphate, potassium salt.

The extreme pressure additive may also equivalently be a sulfur-based derivative such as sulfurized fatty esters, sulfurized hydrocarbons, sulfurized triglycerides, alkyl polysulfides and combinations.

The dissipative surfactant composition suitable for use with the aqueous drilling or completion fluid may be composed of from about 2% to 30% extreme pressure additive by weight of the drilling fluid composition, or in an amount from about 0.1 to about 20% by weight of the dissipative surfactant composition. Preferably, the extreme pressure additive is present in an amount of up to or about 0.5, 1, 2, 3, 4, 5, 10, 15, or 20% of the dissipative surfactant composition. In accordance with select aspects of the invention, the ratio of the vegetable oils or triglycerides to the polar non-chlorine extreme pressure additive is in the range of from about 1:1.5 to about 48:1, as appropriate.

Drilling/Wellbore Fluid Formulation

In one embodiment of the present disclosure, a water-based drilling fluid or drilling fluid system comprises an aqueous fluid, a dissipative surfactant composition comprised of a plant-derived oil or triglyceride such as canola oil or its components as described above, and an extreme pressure/friction reducing additive, and optionally one or more synthetic diesters having from 8 (or less) to 28 carbon atoms, the aqueous fluid system further and optionally containing at least one of a weighting agent, a gelling agent/viscosifier, an alkaline buffer, and a filtration control additive. Exemplary synthetic diesters suitable for use in the present dissipative medium compositions include but are not limited to alkyl, isoalkyl, cycloalkyl, aryl, aryl-substituted alkyl, or ring-opened alkyl diesters, having from either from 8 to 28 carbon atoms, or in the alternative, 8 or fewer carbon atoms, depending on the specifics of the formulation. Such synthetic diesters are the reaction product of monohydroxy alcohols and dicarboxylic acids.

In an exemplary formulation in accordance with aspects of the present disclosure, the dissipative surfactant composition comprises a natural or transgenic plant or vegetable oil, or carboxylic acid (such as oleic or ricinoleic acid), or a fatty acid (such as a triglyceride) derived or obtained from a naturally occurring or transgenic plant or vegetable species in an amount ranging from about 30 wt. % to about 85 wt. %; a phosphorus- or sulfur-containing extreme pressure additive in an amount ranging from about 0.1 wt. % to about 20 wt. %; an optional synthetic ester or diester in an amount ranging from 0 wt. % to about 15 wt. %; an optional polymer in an amount ranging from 0 wt. % to about 25 wt. %; and an optional emulsifier in an amount ranging from about 0 wt. % to about 30 wt. %. In accordance with certain aspects of the disclosure, the dissipative surfactant composition advantageously exhibits a flash point of greater than 200° F. (93° C.), and preferably greater than about 300° F. (149° C.).

The aqueous fluid includes substantially any aqueous fluid that does not adversely react with the constituents of the fracturing fluid, the subterranean formation, or the fluids present therein. The aqueous fluid can include, for example, fresh water, natural brines, or artificial brines, such as potassium chloride solutions, sodium chlorides solutions, and the like.

The aqueous fluid of the well bore fluid may include at least one of fresh water, sea water, brine (e.g., NaCl, KCl, NaBr, KBr, $CaCl_2$, $CaBr_2$, $ZnBr_2$, $ZnCl_2$, $CaCl_2/CaBr_2/ZnBr_2$, $NaCO_2H$, $KCO_2H$, and $CsCO_2H$ brines), mixtures of water and water-soluble organic compounds and mixtures thereof. For example, the aqueous fluid may be formulated with mixtures of desired salts in fresh water. Such salts may include, but are not limited to alkali metal chlorides, hydroxides, or carboxylates, for example. In various embodiments of the drilling fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium, salts of chlorides, bromides, carbonates, iodides, chlorates, bromates, formates, nitrates, oxides, phosphates, sulfates, silicates, and fluorides. Salts that may be incorporated in a given brine include any one or more of those present in natural seawater or any other organic or inorganic dissolved salts. Additionally, brines that may be used in the drilling fluids disclosed herein may be natural or synthetic, with synthetic brines tending to be much simpler in constitution. In one embodiment, the density of the drilling fluid may be controlled by increasing the salt concentration in the brine (up to saturation). In a particular embodiment, a brine may include halide or carboxylate salts of mono- or divalent cations of metals, such as cesium, potassium, calcium, zinc, and/or sodium.

In one embodiment, the water-based drilling fluid system of the present disclosure may further and optionally include one or more weighting agents or materials. Weighting materials suitable for use in the fluid compositions disclosed herein are preferably solid-phase materials selected from the group consisting of anglesite ($PbSO_4$), barite ($BaSO_4$) and other barium-containing minerals or materials, calcite ($CaCO_3$), celestite/celestine ($SrSO_4$), crocoite ($PbCrO_4$), hematite ($Fe_2O_3$), ilmenite ($FeTiO_3$), or combinations thereof. The quantity of such material added, if any, may depend upon the desired density of the final composition. Typically, a weighting agent is added to result in a drilling fluid density of up to about 24 pounds per gallon.

In another embodiment, the water-based drilling fluid may include one or more gelling agents. The gelling agents suitable for use in the fluids disclosed herein may include both high-gravity and low-gravity solids, the latter of which may include both active solids, such as clays, polymers, and combinations thereof, and inactive solids. In a non-limiting aspect of the disclosure, the gelling agent may be any appropriate clay, including, but not limited to, palygorskite-type clays such as sepiolite, attapulgite, and combinations thereof, smectite clays such as hectorite, montmorillonite, kaolinite, saponite, bentonite, and combinations thereof, Fuller's earth, micas, such as muscovite and phologopite, as well as synthetic clays, such as laponite. The gelling agent may also be a water-soluble polymer which will hydrate in the treatment fluids described herein upon addition. Suitable water-soluble polymers which may be used in these treatment fluids include, but are not limited to, synthesized biopolymers, such as xanthan gum, cellulose derivatives, naturally-occurring polymers, and/or derivatives of any of these water-soluble polymers, such as the gums derived from plant seeds.

Polymeric fluid loss control additives used in well drilling and servicing fluids are so-called water-soluble polymers including pregelatinized starch, starch derivatives, cellulose derivatives, lignocellulose derivatives, and synthetic polymers. Representative starch derivatives include: hydroxyalkyl starches such as hydroxyethyl starch, hydroxypropyl starch, hydroxypropyl carboxymethyl starch, the slightly crosslinked derivatives thereof, and the like; carboxymethyl starch and the slightly crosslinked derivatives thereof; cationic starches such as the tertiary amnioalkyl ether derivatives of starch, the slightly crosslinked derivatives thereof, and the like. Representative cellulose derivatives include low molecular weight carboxymethyl cellulose, and the like. Representative lignocellulose derivatives include the alkali metal and alkaline earth metal salts of lignosulfonic acid and graft copolymers thereof. Representative synthetic polymers include vinyl sulfonate copolymers, and polymers containing other sulfonate monomers.

Optionally, but preferably, the fluid compositions of this invention may contain an alkaline buffer additive. The alkaline buffer may be any alkaline particulate material having a low water solubility which will react with acids to decrease the acidity of the fluids. Representative alkaline buffers are magnesium oxide, calcium oxide, zinc oxide, calcined dolomite, magnesium hydroxide, calcium hydroxide, zinc hydroxide, hydrated dolomitic lime (calcium/magnesium hydroxide), and the like. In accordance with this invention, the fluids should exhibit measured pH's in the range from about 3.0 to about 11.0. Brines containing zinc bromide should have a pH less than about 6.0 as is well known in the art. Although the actual pH's of highly concentrated salt solutions cannot be accurately read using a pH meter, the relative pH's of several different highly concentrated salt solutions may be accurately compared. Thus, the measured pH's of such highly concentrated solutions become a reliable monitoring method for determining the relative acidity of the fluids involved. The measured pH's are determined with a standard pH meter, the electrode of which is inserted into the solution to be measured. As used herein, the term "measured pH" refers to pH's determined in the foregoing manner. Where it is necessary to adjust the measured pH, the adjustment may be carried out at substantially any time in accordance with this invention.

The fluids of this invention may contain other functional additives to impart specific properties to the fluids. Thus the fluids may contain lost circulation materials, corrosion inhibitors, anti-oxidants, oxygen scavengers, reducing agents, polymer breakers, shale inhibitors, supplemental filtration control additives, supplemental viscosifiers, emulsifiers, polymers, and the like. In additions, the fluids may also, optionally contain one or more anti-microbial/biocidal agents having water solubility, in any appropriate amount. Exemplary, suitable biocidal agent for use with the compositions and systems of the present invention are BIO-KLEEN® and BioBAN™ P-1487, both available from the Dow Chemical Company (Midland, Mich., USA).

In one embodiment, a method of treating a well bore comprises mixing an aqueous fluid comprising at least one of an alkaline buffer, a gelling agent, and a dissipative surfactant system as described herein. The dissipative surfactant comprises at least one fatty acid or one ester derivative of at least one fatty acid derived from a plant or vegetable oil, such as canola oil or the like, to form a water-based well bore fluid. The water-based well bore fluid may then be used during a drilling operation. The fluid may be pumped to the bottom of the well through a drill pipe where the fluid emerges through ports in the drilling bit, for example. In one embodiment, the fluid may be used in conjunction with any drilling operation, which may include, for example and without limitation, vertical drilling, horizontal drilling, extended reach drilling, and directional drilling. One skilled in the art would recognize that water-based drilling muds and drilling fluids may be prepared with a large variety of formulations. Specific formulations may depend on the state of drilling a well at a particular time, for example, depending on the depth and/or the composition of the formation, as well as the temperature of the formation. The aqueous drilling mud and fluid compositions described herein may be adapted to provide improved water-based drilling muds under conditions of high temperature and pressure, such as those encountered in deep wells.

Methods of Use

The above-described compositions are useful for treating oil and/or gas wells suspected of, or known to contain, oil/tar sand. Useful compositions include those comprising water or a similar aqueous base fluid, an alkaline buffer, and a dissipative surfactant including at least one fatty acid or fatty acid ester derived from, or obtained from, a vegetable or plant.

The methods can comprise selecting an oil and/or gas well, and pumping one of the above described compositions into the well, or alternatively drilling an oil or gas well in a difficult formation, e.g., oil/tar sand, using an aqueous composition as described herein as at least a part of the drilling fluid. As a result of such methods, the dissipative surfactant composition within the aqueous composition displays anti-agglomeration/dispersive characteristics on oil/tar sand, thereby generating a uniform drilling fluid mixture with improved flow properties and a reduced coefficient of friction, or lubricity.

The lubricity of a drilling fluid is important for enhancing the economics of drilling and completing difficult drilling scenarios, such as high angle holes and formations with a high degree of oil/tar sand. Lubricity is a measure of the coefficient of friction between a moving part and a surface in contact with the part. The lower the coefficient of friction, the greater the lubricity. The coefficient of friction, u, is defined as the ratio of the force, F, required to move an object in contact with a surface to the force, $W_1$, pushing downward or perpendicular to the object: $u=F/W_1$. The coefficient of friction may alternatively and equivalently be called the friction coefficient, friction factor, or the lubricity coefficient. The lubricity of a drilling fluid is a measure of the mud's ability to lower torque and drag forces.

In accordance with embodiments of the present invention, the aqueous-based drilling system compositions comprising a dissipative surfactant composition substantially reduces the coefficient of friction (and increases the lubricity) compared to a fluid absent the dissipative surfactant system. In accordance with some aspects, the instant compositions can reduce the coefficient of friction of an aqueous drilling fluid by an amount ranging from about 45% to about 85%, and more preferably by an amount ranging from about 50% to about 75%, compared to an aqueous-based fluid that does not contain a dissipative surfactant system in accordance with this invention. The drilling fluid systems of the present disclosure may also exhibit other advantageous and synergistic effects on a hydrocarbon-recovery drilling system, including reducing the torque and/or drag associated with the use of a drill bit in penetrating subterranean formations.

The pumping can be performed in a single pumping event, multiple pumping events, or as a continuous pumping process. The well can be "closed in," allowing the compositions to contact the well for a period of time during which additional pumping or drilling is not performed.

In one embodiment, a method of treating a well bore comprises mixing an aqueous fluid comprising at least one of a weighting agent and a gelling agent, and a dissipative surfactant composition or system. The dissipative surfactant system comprises at least one fatty acid or fatty acid derivative derived from a plant or vegetable oil (transgenic or non-transgenic/naturally-occurring) and an extreme pressure additive to form an aqueous water-based wellbore fluid, the dissipative surfactant system being substantially (greater than 90%, and preferably greater than 95%) soluble in water, optionally as an emulsion. The water-based wellbore fluid may then be used during a drilling operation. The fluid may be pumped down to the bottom of the well through a drill pipe, where the fluid emerges through ports in the drilling bit, for example. In one embodiment, the fluid may be used in conjunction with any drilling operation, which may include, for example, vertical drilling, extended reach drilling, and directional drilling. Preferably, in accordance with the present disclosure, the drilling operation involves oil/tar sand or an oil/tar sand formation. One skilled in the art would recognize that water-based drilling fluids, systems, and muds may be prepared with a large variety of formulations. Specific formulations may depend on the state of drilling a well at a particular time, for example, depending on the depth and/or the composition of the formation. The drilling fluid compositions and systems described above may be adapted to provide improved water-based drilling fluids under conditions of high temperature and pressure, such as those encountered in deep wells.

The following examples are included to demonstrate preferred embodiments of the invention. It should be appreciated by those of skill in the art that the techniques disclosed in the examples which follow represent techniques discovered by the inventor(s) to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

EXAMPLES

Example 1: Preparation and Evaluation of Control Fluid System

A control drilling and completion fluid system was prepared by admixing 0.96 bbl fresh water, 4.0 lb/bbl of Thixsal-Ultra™ (xanthan gum biopolymer and derivatized starch which acts as a gelling/filtration control agent), 4.0 lb/bbl FL-7 Plus® (a stabilized non-ionic derivatized starch that controls high temperature-high pressure filtrate loss), 1.0 lb/bbl pH Buffer, (magnesium oxide alkaline buffer), 8.0 lb/bbl Ultra Carb 2, (sized calcium carbonate weighting agent, D-50 particle size of 2 microns), 30.0 lb/bbl Ultra Carb 20 (sized calcium carbonate weighting agent, D-50 particle size of 20 microns), and 20.0 lb/bbl of oil/tar sand. Thixsal-Ultra™, FL-7 Plus®, pH Buffer, Ultra Carb 2, and Ultra Carb 20 are manufactured and distributed by TBC-Brinadd (Houston, Tex., USA). Following mixing, viscosities at various shear rates, coefficients of friction, and high temperature-high pressure filtrates were determined initially after mixing, and after dynamic aging at 150° F. for 16 hours using API standards. The data is presented in Tables A-D.

Example 2: Preparation and Evaluation of Dissipative Surfactant System of the Invention A drilling and completion fluid system was prepared by admixing 0.96 bbl of fresh water, 4.0 lb/bbl of Thixsal-Ultra™ (xanthan gum biopolymer and derivatized starch which acts as a gelling/filtration control agent), 4.0 lb/bbl FL-7 Plus® (a stabilized, non-ionic derivatized starch that controls high temperature-high pressure filtrate loss), 1.0 lb/bbl pH Buffer (magnesium oxide alkaline buffer), 8.0 lb/bbl Ultra Carb 2 (sized calcium carbonate weighting agent, D-50 particle size of 2 microns), 30.0 lb/bbl Ultra Carb 20 (sized calcium carbonate weighting agent, D-50 particle size of 20 microns), 20.0 lb/bbl of oil/tar sand, and 3%/vol. Bio-Stable (exemplary dissipative surfactant composition of the present disclosure, manufactured for use herein by ProOne Inc., Costa Mesa, Calif.). Thixsal-Ultra™, FL-7 Plus®, pH Buffer, Ultra Carb 2, and Ultra Carb 20 are manufactured and distributed by TBC-Brinadd (Houston, Tex., USA). Following mixing, viscosities at various shear rates, coefficients of friction, and high temperature-high pressure filtrates were determined initially after mixing, and after dynamic aging at 150° F. for 16 hours using API standards. That is, the initial fluid properties were measured before the samples were dynamically aged (hot rolling ovens to simulate downhole conditions) in a pressurized cell (to avoid boiling). Fluid properties were also measured after the aging process to monitor the effect of temperature during time on the samples. The aging temperature was the same as the maximum reservoir temperature. The data is presented in Tables A-D.

TABLE A

Initial Viscosity Comparison.

| Shear Rate (sec$^{-1}$) | Example 1 (cP) | Example 2 (cP) | Change (%) |
| --- | --- | --- | --- |
| 1,022 | 28 | 27 | −3.6 |
| 511 | 43 | 40 | −7.0 |
| 341 | 56 | 48 | −14.3 |
| 170 | 87 | 75 | −13.8 |
| 10.2 | 701 | 551 | −21.4 |
| 5.1 | 1,202 | 901 | −25.0 |
| 0.0636 | 43,396 | 29,994 | −30.9 |

All viscosities recorded at 76° F.
Example 1 = the control fluid system;
example 2 = the dissipative surfactant system.

TABLE B

Dynamic Aged Viscosity Comparison.

| Shear Rate (sec$^{-1}$) | Example 1 (cP) | Example 2 (cP) | Change (%) |
| --- | --- | --- | --- |
| 1,022 | 29 | 24 | −17.2 |
| 511 | 46 | 36 | −21.7 |
| 341 | 62 | 47 | −24.2 |
| 170 | 99 | 72 | −27.3 |
| 10.2 | 751 | 551 | −26.6 |
| 5.1 | 1,403 | 1,002 | −28.6 |
| 0.0636 | 51,589 | 21,495 | −58.3 |

Dynamic aging was carried out at 150° F. for 16 hours;
viscosities were recorded at 76° F.;
example 1 = the control fluid system;
example 2 = the dissipative surfactant system.

Figure 1:
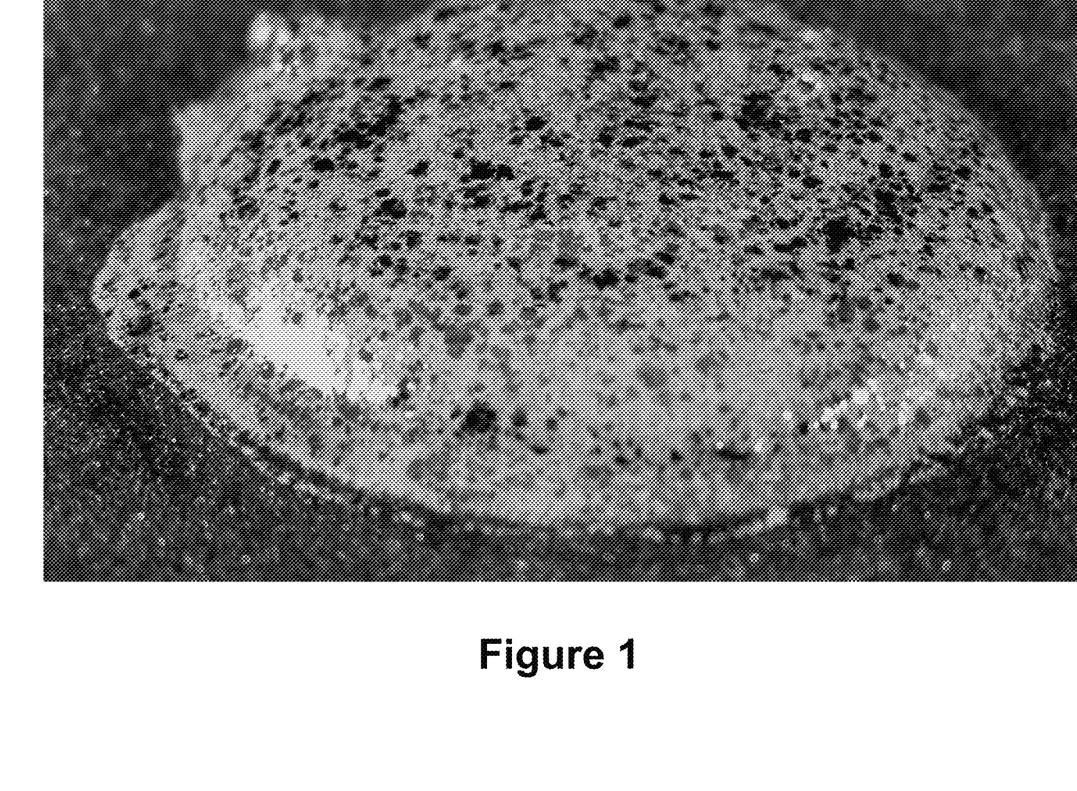
FIG. 1 is an image of the oil/tar sand used in the testing of the compositions of the present disclosure.
Figure 2:
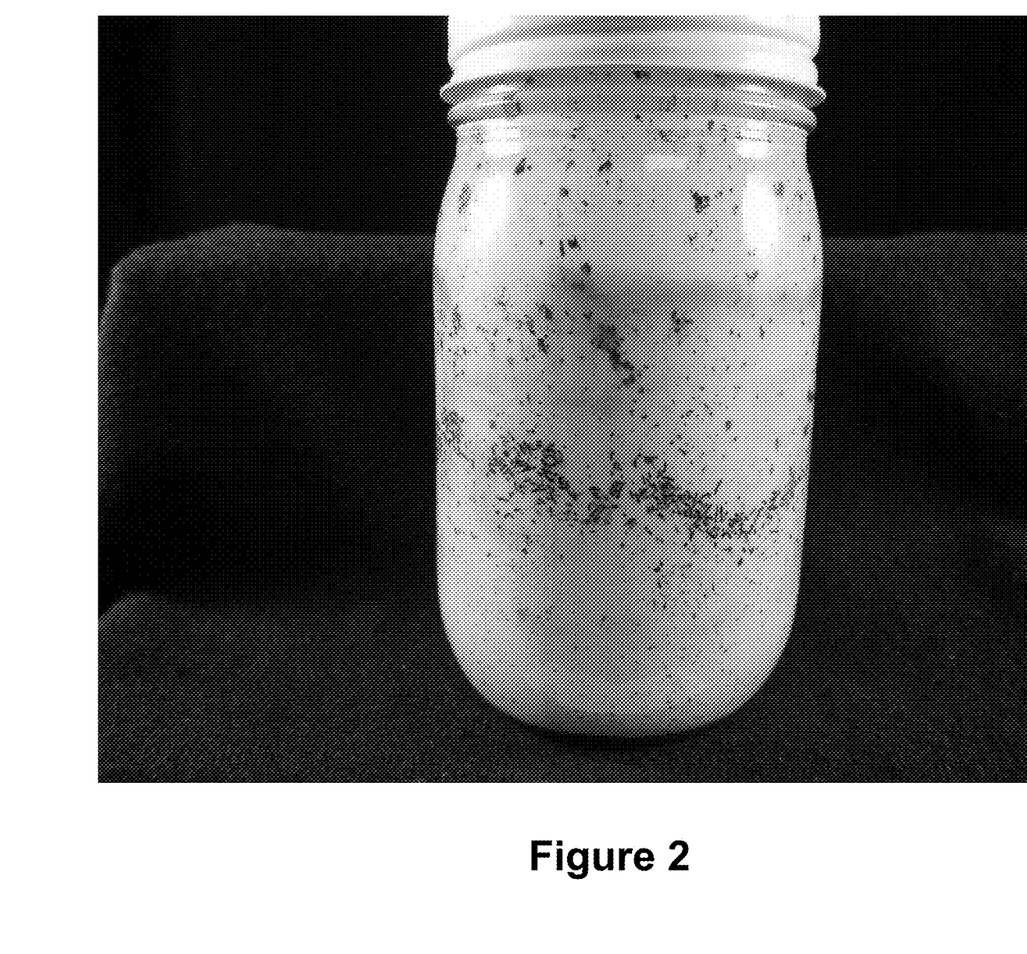
FIG. 2 is a photograph of the composition of Example 1 with 20 lb/bbl oil/tar sand, after dynamic aging.
Figure 3:
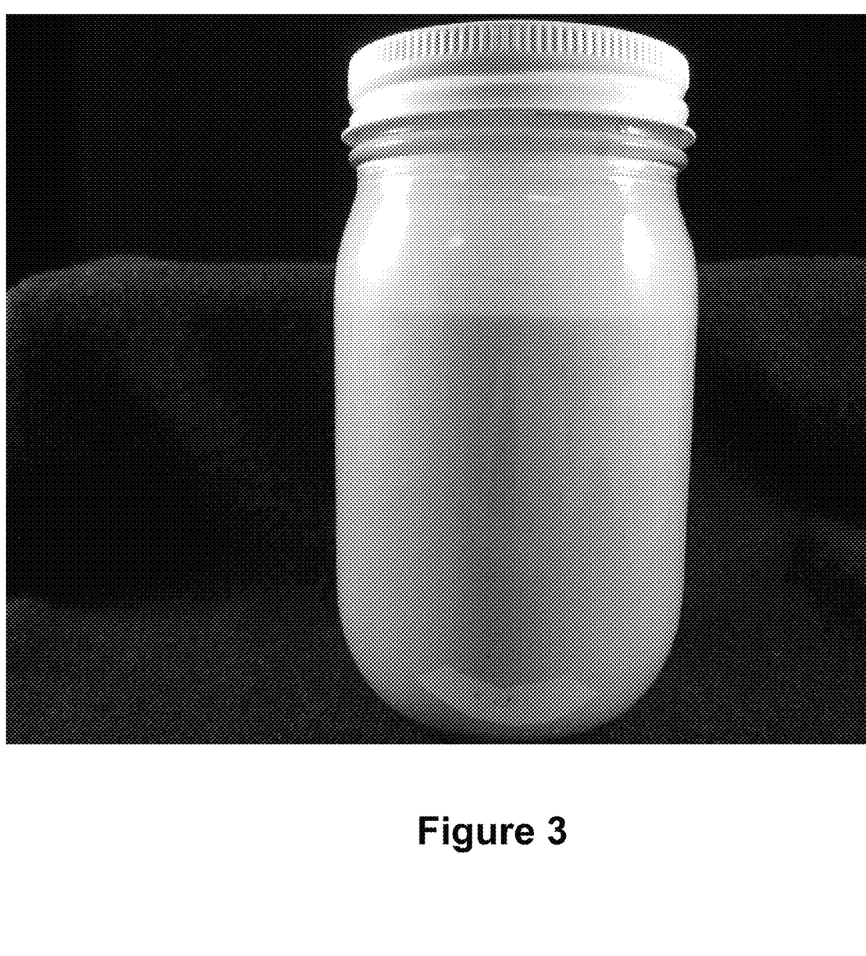
FIG. 3 is a photograph of the composition of Example 2, containing a dissipative surfactant in accordance with the present disclosure, after dynamic aging.

The test results for Examples 1 and 2 illustrate the ability of the compositions described herein to produce substantial changes in the viscosity of well drilling and completion systems across a broad range of shear rates. Table A shows that a composition containing 3%/vol. dissipative surfactant will disperse the oil/tar sand (FIG. 1) and reduce the initial viscosity by 3.6% to 30.9%, and the dynamic aged viscosity by 17.2% to 58.3% at shear rates of 1,022 sec$^{-1}$ and 0.0636 sec$^{-1}$, respectively. The data associated with the dynamic aged fluid samples is shown in FIGS. 2 and 3. FIG. 3 shows complete dispersion in the dynamically aged fluid containing a composition including a dissipative surfactant composition in accordance with the present invention, as exhibited by the substantially homogenous and uniform fluid with no residual oil/tar sand adhering to the sides of the glass container, compared to the untreated fluid shown in FIG. 2 which shows the oil/tar sand being non-dispersed and the untreated fluid being non-homogenous.

TABLE C

Coefficient of Friction Comparison.

| Sample | Example 1 | Example 2 | Change (%) |
| --- | --- | --- | --- |
| Initial | 0.1823 | 0.0529 | −71.0 |
| Dynamic Aged[1] | 0.2489 | 0.1180 | −52.6 |

[1]Aged at 150° F. for 16 hours.

The control fluid system (Example 1) and the dissipative surfactant system (Example 2) at both the initial stage, and after dynamic aging (150° F. for 16 hours), were tested on a Baroid lubricity meter at 76° F. The lubricity coefficient (coefficient of friction) of the samples was calculated and recorded in Table C. The results in Table C demonstrate that a composition containing 3%/vol. dissipative surfactant will reduce the coefficient of friction by 71.0% on the sample initially after mixing, and 52.6% on the sample that was dynamically aged at 150° F. for 16 hours.

TABLE D

Filtrate Loss Comparison.

| Sample | Example 1 (mL) | Example 2 (mL) | Change (%) |
| --- | --- | --- | --- |
| Initial | 12.0 | 10.0 | −16.7 |
| Dynamic Aged | 8.0 | 7.5 | −6.3 |

Filtration was conducted at 150° F. and 500 psi for 30 minutes;
the filtration media was a 10 Darcy aloxite disk;
dynamic aging was carried out at 150° F. for 16 hours;
viscosities were recorded at 76° F.;
example 1 = the control fluid system;
example 2 = the dissipative surfactant system.

The results in Table D show that a composition containing 3%/vol. dissipative surfactant will reduce the filtrate loss by 16.7% initially after mixing, and 6.3% on the sample that was dynamically aged at 150° F. for 16 hours.

Other and further embodiments utilizing one or more aspects of the inventions described above can be devised without departing from the spirit of Applicant's invention. For example, additives other than those recited herein may be included, and further enhance the effects of the instant compositions due to a synergistic effect. Further, the various methods and embodiments of the methods of practicing the invention can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A method of dispersing bituminous sand, the method comprising:
   preparing an aqueous-based drilling fluid, wherein the aqueous-based drilling fluid consists of:
      an aqueous base fluid,
         at least one fatty acid derived from a plant or fatty acid derivative derived from a plant, and
         one or more of a gelling/filtration control agent, fluid loss preventative, extreme pressure additive, buffer, or weighting agent, and
   contacting the bituminous sand with the aqueous-based drilling fluid.

2. The method of claim 1, wherein the at least one fatty acid is ricinoleic acid, linoleic acid, oleic acid, stearic acid, palmitic acid, dihydroxystearic acid, lenolenic acid, or eicosanoic acid.

3. The method of claim 1, wherein the fatty acid derivative is an ester.

4. The method of claim 3, wherein the ester is derived from at least one of a mono-, di-, tri-, or polyol.

5. The method of claim 3, wherein the ester is derived from sorbitan or pentaerythritol.

6. The method of claim 1, wherein the aqueous-based drilling fluid comprises about 1 vol. % to about 5 vol. % of the dissipative surfactant composition.

7. The method of claim 1, wherein the aqueous-based drilling fluid comprises about 1 vol. % to about 3 vol. % of the dissipative surfactant composition.

8. The method of claim 1, wherein the dissipative surfactant composition comprises about 20 to about 95% fatty acid or fatty acid derivative.

9. The method of claim 1, wherein the dissipative surfactant composition comprises up to about 75 wt. % fatty acid or fatty acid derivative.

10. The method of claim 1, wherein contacting the bituminous sand comprises pumping the aqueous-based drilling fluid into a well.

11. The method of claim 1, wherein the dissipative surfactant composition includes an extreme pressure additive.

12. The method of claim 1, wherein contacting the bituminous sand comprises mixing the bituminous sand and the aqueous composition in a container.

13. The method of claim 1, wherein the plant is *Allium cepa, Allium porum, Brassica oleracea, Brassica campestris, Brassica napes, Beta vulgaris,* or *Daucus carota.*

* * * * *